United States Patent [19]

Saito et al.

[11] 4,337,947
[45] Jul. 6, 1982

[54] GOLF BALL

[75] Inventors: Tasuku Saito, Tokorozawa; Tutomu Noma, Higashimurayama; Tsutomu Matsunaga, Iruma; Chiaki Tanaka, Chita; Yoko Furuta; Nagayoshi Naito, both of Nagoya, all of Japan

[73] Assignees: Bridgestone Tire Co., Ltd.; Toray Industries, Inc., both of Tokyo, Japan

[21] Appl. No.: 209,194

[22] Filed: Nov. 21, 1980

[30] Foreign Application Priority Data

Dec. 10, 1979 [JP] Japan .................................. 54-159269

[51] Int. Cl.$^3$ .............................................. A63B 37/12
[52] U.S. Cl. .......................... 273/235 R; 260/998.14; 525/176
[58] Field of Search ............... 260/998.14; 273/235 R; 525/176

[56] References Cited

U.S. PATENT DOCUMENTS

| | | | |
|---|---|---|---|
| 3,454,280 | 7/1969 | Harrison et al. | 273/235 R |
| 3,819,768 | 6/1974 | Molitor | 273/235 R |
| 3,940,146 | 2/1976 | Little | 260/998.14 |
| 4,185,831 | 1/1980 | Tominaga | 273/235 R |
| 4,272,079 | 6/1981 | Nakade et al. | 273/235 R |

Primary Examiner—Allan Lieberman
Attorney, Agent, or Firm—Austin R. Miller

[57] ABSTRACT

An improved golf ball having a thread-wound central core and an outer cover is provided. The outer cover is composed of a composition comprising (a) at least one ionomer which is a copolymer of at least one α-olefin and at least one α,β-unsaturated carboxylic acid to which copolymer at least one metal ion selected from the group consisting of monovalent, divalent and trivalent metal ions is added and (b) at least one polyester elastomer, the content, in said composition, of said polyester elastomer being 50% by weight or less. This golf ball has excellent cutting resistance, "click" characteristics and impact resilience.

11 Claims, No Drawings

GOLF BALL

The present invention relates to a golf ball having a thread-wound central core and, more especially, it relates to an improved golf ball having a thread-wound central core and an outer cover for the core.

One of the functions of the cover of a golf ball is the prevention of damage to the thread-wound central core when the ball is hit with a club. Therefore, the outer cover of a golf ball must have durability, i.e., cutting resistance, when hit with a club head.

Used heretofore, as the cover material of golf balls, has been balata. Golf balls having a balata cover are generally accepted by skilled golfers. However, since the balata cover does not always exhibit sufficient cutting resistance when the ball is hit by beginners and since the balata is expensive, various attempts have been made to develop new materials which can be substituted for balata as the cover material of golf balls. Recently, golf balls for beginners, having the outer cover of ionomers, that is, copolymers of $\alpha$-olefins and $\alpha,\beta$-unsaturated carboxylic acids to which copolymer monovalent, divalent and/or trivalent metal ions are added, have been placed on the market.

Although golf balls having the ionomer cover exhibit an especially excellent cutting resistance, the ionomer golf balls are disadvantageous in that the sound thereof when hit with a club, usually called "click," is much sharper than that of the golf balls having the balata cover, and therefore, causes golfers to feel a sense of apprehension. Further, the impact resilience of the ionomer golf balls is somewhat inferior to that of golf balls having the balata cover. For these reasons, the ionomer golf balls, have not been well accepted by skilled golfers.

Accordingly, an object of the present invention is to overcome the afore-mentioned problems of the prior art and to provide an improved golf ball which has a superior cutting resistance characteristic of the ionomer cover and exhibits nearly as excellent "click" characteristics as those of the balata cover and exhibits a superior impact resilience.

The present invention is a golf ball comprised of a thread-wound center core and an outer cover for the core, said cover being composed of a composition comprising (a) at least one ionomer which is a copolymer of at least one $\alpha$-olefin and at least one $\alpha,\beta$-unsaturated carboxylic acid to which copolymer at least one metal ion selected from the group consisting of monovalent, divalent and trivalent metal ions is added and (b) at least one polyester elastomer, the content, in said composition, of said polyester elastomer being 50% by weight or less.

An outer cover of a golf ball used in the present invention is composed of two polymeric components, i.e., (a) at least one ionomer which is a copolymer of at least one $\alpha$-olefin and at least one $\alpha,\beta$-unsaturated carboxylic acid to which copolymer at least one metal ion selected from the group consisting of monovalent, divalent and trivalent metal ions is added and (b) at least one polyester elastomer.

The $\alpha$-olefins used, as a monomeric component which forms the ionomer, in the present invention include, for example, ethylene, propylene and butene-1. Among these $\alpha$-olefins, ethylene is preferred. The concentration of $\alpha$-olefins in the copolymer is from 75 to 99.8 mole %, preferably from 90 to 99 mole %.

The $\alpha,\beta$-unsaturated carboxylic acids used, as another monomeric component which forms the ionomer, in the present invention are, for example, those having 3 to 8 carbon atoms, such as acrylic acid, methacrylic acid, ethacrylic acid, itaconic acid, maleic acid and half ester of maleic acid. Among these $\alpha,\beta$-unsaturated carboxylic acids, acrylic acid and methacrylic acid are preferred. The concentration of $\alpha,\beta$-unsaturated carboxylic acids in the copolymer is from 0.2 to 25 mole %, preferably from 1 to 10 mole %.

Said copolymer may optionally further contain lower alkyl esters of $\alpha,\beta$-unsaturated carboxylic acids in a small amount in order to improve the compatibility of the ionomers with the polyester elastomers. The lower alkyl esters of $\alpha,\beta$-unsaturated carboxylic acids used, as an optional monomeric component which forms the ionomer, in the present invention include, for example, methyl methacrylate, ethyl methacrylate, isopropyl methacrylate, t-butyl methacrylate, methyl acrylate, ethyl acrylate, butyl acrylate, methyl ethacrylate and butyl ethacrylate. The concentration of lower alkyl esters of $\alpha,\beta$-unsaturated carboxylic acids in the copolymer is from 0 to 20 mole %, preferably from 1 to 10 mole %.

The ionomers used, as one polymeric component of outer cover material, in the present invention are ionic copolymers having ionic crosslinkages, between the carboxylic acid groups in the molecule thereof and at least one metal ion selected from the group consisting of monovalent, divalent and trivalent metal ions, which crosslinkages are formed by adding said metal ion to the copolymer consisting of the above-mentioned components. The monovalent, divalent and trivalent metal ions suitable for the formation of ionic crosslinkages include, for example, sodium, potassium, lithium, magnesium, calcium, zinc, aluminum, ferric and ferrous ions. The introduction of ionic crosslinkages into the copolymer is carried out by reacting the copolymer with the hydroxide, methoxide, ethoxide, carbonate, nitrate, acetate, formate or oxide of monovalent, divalent or trivalent metal. At least 10% of the carboxyl groups in the copolymer should generally be neutralized with the metal ion.

Two or more types of ionomers may optionally be used by mixing together in order to control the feeling characteristics of golf balls and to obtain more compatible blends with the copolyetheresters.

Another polymeric component of outer cover materials used in the present invention is a polyester elastomer. The polyester elastomer is added to improve impact resilience and "click" characteristics of the golf ball having the ionomer cover.

The polyester elastomers used, as an polymeric component of outer cover materials, in the present invention include, for example, polyetherester block copolymers, polylactone-ester block copolymers, and aliphatic and aromatic dicarboxylic acid copolyesters.

The polyetherester block copolymers used in the present invention are those which are composed of (i) polyester hard segments comprising dicarboxylic acid components and low molecular weight diol components and (ii) polyether soft segments comprising polymers of alkylene glycols of 2 to 10 carbon atoms. 40 mole % or more of the dicarboxylic acid components are preferably aromatic dicarboxylic acid, such as terephtalic acid, due to their mechanical properties such as break strength, resilience and the like. As the low molecular weight diol components, aliphatic and alicyclic diols of 2 to 10 carbon atoms can be used alone or in any mixture thereof.

The polylactone-ester block copolymers used in the present invention are those in which the soft segments (i.e. the polyether chains) of the above-mentioned polyetherester block copolymers are replaced with polylactone chains.

The aliphatic and aromatic dicarboxylic acid copolyesters used in the present invention are, for example, copolymers of (i) acid components comprising aromatic dicarboxylic acids (e.g. terephthalic acids and iosphthalic acids) and aliphatic dicarboxylic acids of 2 to 10 carbon atoms and (ii) diol components comprising at least one member selected from the group consisting of aliphatic and alicyclic diols of 2 to 10 carbon atoms. Furthermore, blends of aliphatic polyesters and aromatic polyesters can also be used, as a polymeric component of outer cover material, in the present invention.

The above-mentioned polyester elastomers used, as a polymeric component of outer cover materials, in the present invention can be prepared in any known manner. In order to impart good impact resilience to golf balls, these polyester elastomers should preferably have a resilience of 35% or more, more preferably 45% or more, and a stress, at 10% strain, of 100 Kg/cm$^2$ or less, more preferably 80 Kg/cm$^2$ or less.

The content of the polyester elastomers in the polymeric composition which forms the outer cover is 50% by weight or less, preferably 40% by weight or less, more preferably 3 through 30% by weight, to impart good cutting resistance and good compatibility with the ionomers.

The composition comprising at least one ionomer and at least one polyester elastomer can be blended by any conventional process for blending polymers. Further, the above-mentioned polymeric composition used, as an outer cover material, in the invention can optionally contain titanium white, as a whitening agent, and can further optionally contain conventional fillers such as silica, zinc oxide, organic chopped fiber, asbestos, glass fiber and the oxide and carbonate of metal and the like.

The golf balls of the present invention can be manufactured by any conventional process. For example, a polymeric composition as an outer cover material is preformed into half cups, a thread-wound central core is covered with the two half cups thus obtained and the half cups are compression molded to form the desired golf ball. Alternatively, the golf ball of the present invention can be manufactured by placing a thread-wound central core between two molds in alignment with the molds and then injection molding an outer cover material to form the outer cover on the entire surface of said thread-wound central core.

The present invention is further illustrated in detail by, but is by no means limited to, the following Examples.

The golf balls obtained in the Examples below were evaluated as follows.

(1) Initial Velocity

An initial velocity was determined by using a golf ball hitting test machine manufactured by TRUE TEMPER CORP., when the ball was hit with a No. 1 wood club under the conditions of the club head speed of 45 m/sec and the ball temperature of 20° C.

(2) Cutting Resistance

Cutting resistance was determined by observing, with the naked eye, the marks caused on the surface of the golf ball after the golf ball was hit with a No. 7 iron at a pressure of 7 Kg/cm$^2$. A golf ball hitting test machine manufactured by TRUE TEMPER CORP. was used.

(3) Impact Feel Characteristics (Click and Feeling in the Hands and Wrists)

An acceleration wave on a putter head caused by putting impact at head speed 2.6 m/s (constant) was determined by using an accelerometer pickup attached to the putter. "Acceleration wave form index" and "Index of high-frequency component" were determined as follows.

*1 Acceleration Wave Form Index:

A ratio of peak value of acceleration to contact time was calculated on each test ball, and an acceleration wave form index of each test ball was determined, based on the acceleration wave form index of the balata cover ball as 100.

*2 Index of High-frequency Component

A ratio of amplitude of the high-frequency component in the acceleration wave to the peak acceleration was calculated, and an index of high-frequency component of each test ball was determined, based on the index of high-frequency component of the balata cover ball as 100.

As both indices of the test ball are nearer 100, qualitative feeling of the test ball when the ball is hit with a club is closer to that of the balata cover ball.

Example 1

80 parts by weight of an ionomer (Surlyn A 1557 ®, manufactured by E. I. du Pont de Nemours & Co. Inc.) which is a copolymer, of ethylene and methacrylic acid, neutralized with zinc ion was homogeneously mixed with 20 parts by weight of a block copolyetherester comprising (A) terephthalic acid, (B) 1,4-butanediol, (C) isophthalic acid and (D) poly(tetramethylene oxide)glycol having a number-average molecular weight of 1000 [the mol ratio of the component (C) to the component (A) was 40/60 and the content of the component (D) in the block copolyetherester was 50% by weight] to form a composition, and the resulting composition was then injection molded to form outer covers in the form of half-cups having a wall thickness of 2 mm.

A thread-wound core, of 26.0 mm in diameter, containing cis-1,4-polybutadiene as a main ingredient was covered with the two half-cups of the outer cover, and the resultant assembly of the golf ball was then compression molded in a mold for the desired golf ball of 41.15 mm in diameter under a pressure of 1.5~20 tons per ball at a temperature of 150° C. for 1 minute to obtain the desired golf ball having a weight of 45.4 g and a diameter of 41.15 mm.

Some properties of the golf balls thus obtained were evaluated. The results are shown in Table 1 below.

Examples 2 and 3

Golf balls were prepared and evaluated in a manner as described in Example 1, except that the mixing ratio (weight ratio) of ionomer to block polyetherester were changed from 80/20 to 70/30 and 55/45, respectively. The results are also shown in Table 1 below.

Example 4

Golf balls were prepared and evaluated in a manner as described in Example 1, except for the use of half-cups of the outer cover having a wall thickness of 1.6 mm and a thread-wound central core having a diameter larger by 0.4 mm than that of the core as used in Example 1. The results are also shown in Table 1 below.

Comparative Example 1

Golf balls comprising a thread-wound core and an outer cover consisting of only an ionomer were prepared and evaluated in a manner as described in Example 1. The results are also shown in Table 1 below.

Comparative Example 2

Commercially available golf balls each comprising a thread-wound core and a balata cover (the diameter was 41.20 mm and the weight was 45.5 g) were evaluated in a manner as described in Example 1. The result were also shown in Table 1.

TABLE 1

|  |  | Example | | | | Comparative Example | |
| --- | --- | --- | --- | --- | --- | --- | --- |
|  |  | 1 | 2 | 3 | 4 | 1 | 2 |
| Outer Cover Composition (Parts by Weight) | Ionomer | 80 | 70 | 55 | 80 | 100 | — |
|  | Polyester elastomer | 20 | 30 | 45 | 20 | — | — |
|  | Balata | — | — | — | — | — | 100 |
|  | Titanium Oxide | 3 | 3 | 3 | 3 | 3 | 3 |
|  | Ball Weight | 45.4 g | 45.5 g | 45.5 g | 45.4 g | 45.3 g | 45.5 g |
| Outer Cover Property | Resilience | 47% | 48% | 49% | 47% | 40% | — |
| Ball Property | Initial Velocity | 66.5 m/s | 66.6 m/s | 66.7 m/s | 66.7 m/s | 66.0 m/s | 66.1 m/s |
|  | Cutting Resistance | Excellent | Excellent | Excellent | Excellent | Excellent | good |
|  | Impact Feel Characteristics (Click and feeling in the hands and wrists) |  |  |  |  |  |  |
|  | Acceleration Wave Form Index*[1] | 114 | 114 | 102 | 108 | 127 | 100 |
|  | Index of High-frequency Component of Acceleration Wave*[2] | 240 | 180 | 120 | 180 | 440 | 100 |

We claim:

1. In a golf ball comprising a thread-wound central core and an outer cover for the core; the improvement wherein said outer cover is composed of a composition comprising (a) at least one ionomer which is a copolymer of 75 to 99.8 mole % of at least one α-olefin and 0.2 to 25 mole % of at least one α,β-unsaturated carboxylic acid to which copolymer at least one metal ion selected from the group consisting of monovalent, divalent and trivalent metal ions is added and (b) at least one polyester elastomer selected from the group consisting of a polyetherester block copolymer, polylactone-ester block copolymer, aliphatic or aromatic dicarboxylic acid copolyester and a mixture of aliphatic dicarboxylic acid copolyester and aromatic dicarboxylic acid copolyester, the content, in said composition, of said polyester elastomer being 3 to 50% by weight.

2. A golf ball as claimed in claim 1, wherein said α-olefin is ethylene, propylene or butene-1.

3. A golf ball as claimed in claim 1, wherein said α,β-unsaturated carboxylic acid is selected from the group consisting of acrylic acid, methacrylic acid, ethacrylic acid, itaconic acid and maleic acid.

4. A golf ball as claimed in claim 1, wherein said copolymer further contains 1 to 10 mole % of at least one lower alkyl ester of α,β-unsaturated carboxylic acid as an optional monomeric component.

5. A golf ball as claimed in claim 4, wherein said lower alkyl ester of α,β-unsaturated carboxylic acid is methyl acrylate, methyl methacrylate, t-butyl acrylate or t-butyl methacrylate.

6. A golf ball as claimed in claim 1, wherein said metal ion is sodium, potassium, lithium, magnesium, calcium, zinc, aluminum, ferric or ferrous ion.

7. A golf ball as claimed in claim 1, wherein at least 10% of the carboxyl groups in said copolymer are neutralized with said metal ion.

8. A golf ball as claimed in claim 1, wherein said polyetherester block copolymer is selected from the group consisting of (i) polyester hard segments comprising dicarboxylic acid components and low molecular weight diol components and (ii) polyether soft segments comprising polymers of alkylene glycols of 2 to 10 carbon atoms.

9. A golf ball as claimed in claim 1, wherein said polyactone-ester block copolymer is selected from the group consisting of (i) polyester hard segments comprising dicarboxylic acid components and low molecular weight diol components and (ii) polylactone soft segments comprising polymers of lactones of 2 to 10 carbon-atoms.

10. A golf ball as claimed in claim 1, wherein said aliphatic or aromatic dicarboxylic acid copolyester is selected from the group consisting of copolymers of (i) at least one member selected from the group consisting of aliphatic dicarboxylic acids of 2 to 10 carbon atoms and aromatic dicarboxylic acids and (ii) at least one member selected from the group consisting of aliphatic and alicyclic diols of 2 to 10 carbon atoms.

11. A golf ball as claimed in claim 1, wherein said polyester elastomer has a resilience of 35% or more and a stress, at 10% strain, of 100 kg/cm² or less.

* * * * *